United States Patent
Giannelos

(10) Patent No.: US 10,990,512 B2
(45) Date of Patent: *Apr. 27, 2021

(54) USER INTERFACE TEST COVERAGE

(71) Applicant: DevFactory FZ-LLC, Dubai Media (AE)

(72) Inventor: Konstantinos Giannelos, Athens (GR)

(73) Assignee: DevFactory Innovations FZ, LLC

( * ) Notice: Subject to any disclaimer, the term of this patent is extended or adjusted under 35 U.S.C. 154(b) by 0 days.

This patent is subject to a terminal disclaimer.

(21) Appl. No.: 16/444,932

(22) Filed: Jun. 18, 2019

(65) Prior Publication Data
US 2019/0303277 A1 Oct. 3, 2019

Related U.S. Application Data

(63) Continuation of application No. 15/662,156, filed on Jul. 27, 2017, now Pat. No. 10,365,993, which is a continuation of application No. 14/689,645, filed on Apr. 17, 2015, now Pat. No. 9,753,840.

(60) Provisional application No. 61/980,845, filed on Apr. 17, 2014.

(51) Int. Cl.
*G06F 11/36* (2006.01)
*G06F 3/0484* (2013.01)

(52) U.S. Cl.
CPC ........ *G06F 11/3676* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 9,047,413 | B2 * | 6/2015 | Romdhane | G06F 11/3684 |
| 2010/0146420 | A1 * | 6/2010 | Bharadwaj | G06F 11/3696 |
| | | | | 715/764 |
| 2011/0307865 | A1 * | 12/2011 | Grieves | G06F 11/3676 |
| | | | | 717/124 |
| 2012/0023485 | A1 * | 1/2012 | Dubey | G06F 11/3684 |
| | | | | 717/125 |

OTHER PUBLICATIONS

Notice of Allowance dated Mar. 15, 2019, filed in U.S. Appl. No. 15/662,156, pp. 1-8.
Terminal Disclaimer—Filed & Electronic dated Mar. 4, 2019, filed in U.S. Appl. No. 15/662,156, pp. 9-11.

(Continued)

*Primary Examiner* — Daxin Wu
(74) *Attorney, Agent, or Firm* — Kent B. Chambers; Terrile, Cannatti & Chambers, LLP

(57) ABSTRACT

A user interface ("UI") code coverage system and process determines the coverage by test code of UI Components in a computer program. In other words, the UI code coverage system and process determine whether the test code tests a UI Component. In at least one embodiment, the UI code coverage system and process identify the particular UI Components tested by the test code, provide coverage (i.e. tested) statistics, provide a visualization of the UI Component tested, provide a visualization of tested and not-tested (also referred to respectively as "covered" and "not covered") UI Components of a UI Screen.

11 Claims, 10 Drawing Sheets

(56) References Cited

OTHER PUBLICATIONS

Response to Non-Final Office Action dated Dec. 26, 2018, filed in U.S. Appl. No. 15/662,156, pp. 12-20.
Non-Final Rejection dated Jul. 27, 2018, filed in U.S. Appl. No. 15/662,156, pp. 21-25.
Applicant Arguments/Remarks Made in an Amendment dated Aug. 15, 2017, filed in U.S. Appl. No. 15/662,156, pp. 26.
Summons to Attend Oral Proceedings dated Jun. 3, 2020 in European Patent Application No. 15 720 521.2-1203, Rijswijk, Netherlands, pp. 1-12.

* cited by examiner

500

| Summarised Screen Coverage | Detailed Screen Coverage |

| Product | Number Of Tests | Covered UI Objects | Total UI Objects | Coverage |
|---|---|---|---|---|
| COMPUTER PROGRAM A | 12 | 129 | 797 | 16.19 % |
| COMPUTER PROGRAM B | 118 | 287 | 4889 | 5.87 % |
| COMPUTER PROGRAM C | 2 | 15 | 15297 | 0.10 % |

*FIG. 5*

USER INTERFACE TEST COVERAGE

CROSS-REFERENCE TO RELATED APPLICATION

This application claims the benefit under 35 U.S.C. § 119(e) and 37 C.F.R. § 1.78 of U.S. Provisional Application No. 61/980,845, filed Apr. 17, 2014, and entitled "USER INTERFACE TEST COVERAGE," which is incorporated by reference in its entirety.

BACKGROUND OF THE INVENTION

Field of the Invention

The present invention relates in general to the field of electronics, and more specifically to a system and method of determining test coverage of a user interface.

Description of the Related Art

A computer program is a set of instructions that is executable by a computer system and, thus, transforms the computer system into a machine that performs specific tasks. The tasks are numerous including retrieving and storing data, performing calculations, and generating user interfaces. A computer program can include any type of code and data in any form (e.g. source code or object code). Computers rely upon computer programs to perform an almost limitless number of functions. Testing of a computer program helps ensure that the program causes the computer system to function as a specialized machine in accordance with design parameters. Ideally, computer program testing provides a comprehensive insight into the quality of the program by, for example, identifying errors and other issues that can detrimentally affect the program or the computer system executing the program.

Computer program testing "exercises" the computer program, i.e. executes the computer program. However, a particular test or suite of tests may not exercise all components of the computer program. In a computer program testing context, "code coverage" refers to the amount of code in a computer program that is exercised by a test or suite of computer program tests. Generally, computer systems do not execute computer programs completely linearly, i.e. the computer program is not executed from beginning to end. Accordingly, computer program tests may or may not comprehensively exercise the computer program. Failure to completely exercise the computer program can fail to identify problems with the computer program. Additionally, determining code coverage become even more difficult when a computer program is utilized on multiple software and hardware platforms.

Various testing products are available to test computer programs such as "TestComplete" and "TestExecute" by SmartBear Software of Massachusetts, USA. Test TestComplete is an open test platform for creating, maintaining, and executing automated tests for desktop, Web, mobile, and client-server software applications. TestExecute is a utility that allows testers to run TestComplete's automated tests and view test results on computers that do not have TestComplete installed.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 5-8 depict exemplary UI Component coverage reports.

DETAILED DESCRIPTION

Figure 7:
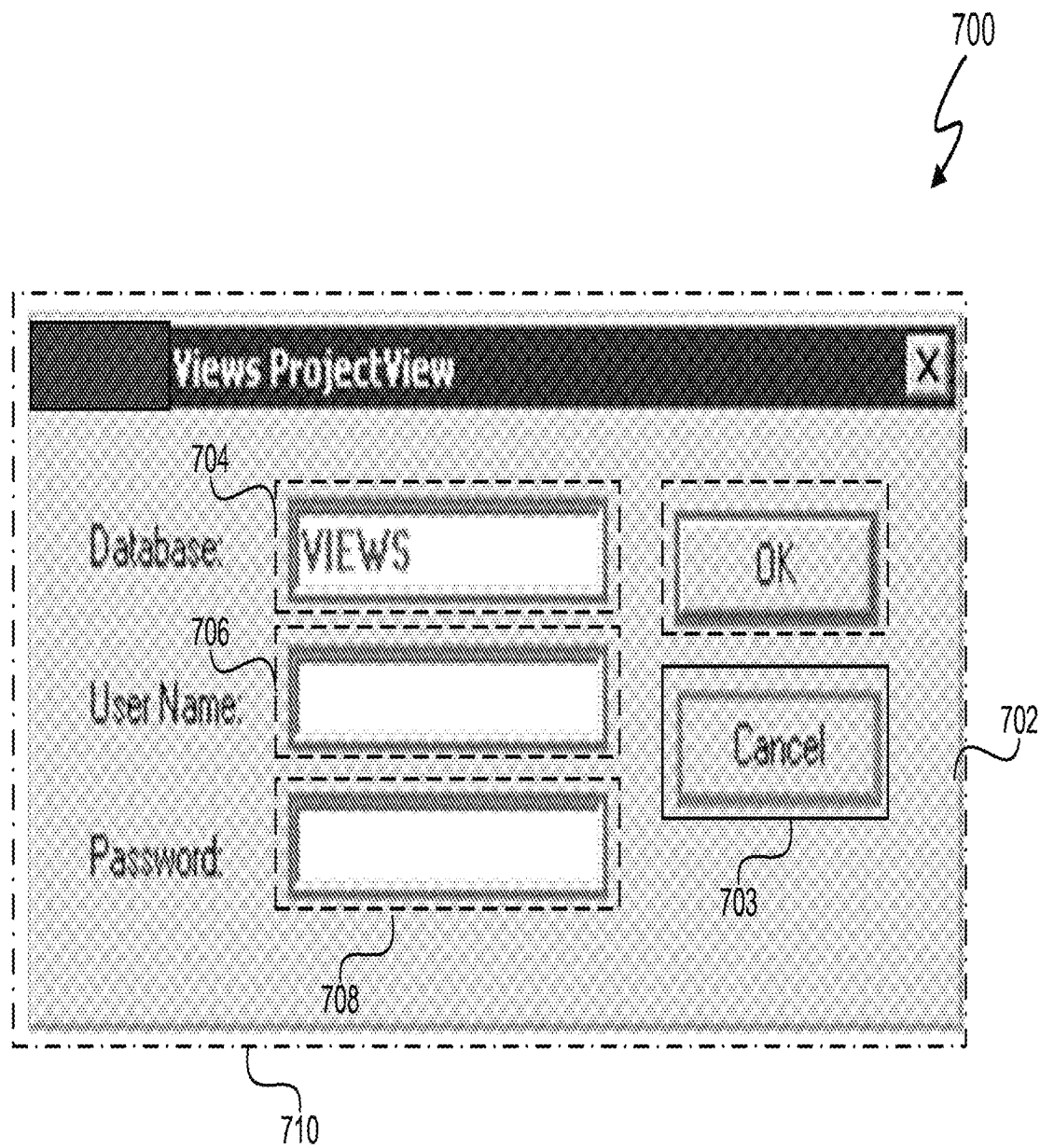

A user interface ("UI") code coverage system and process determines the coverage by test code of UI Components in a computer program. In other words, the UI code coverage system and process determine whether the test code tests a UI Component. In at least one embodiment, the UI code coverage system and process identify the particular UI Components tested by the test code, provide coverage (i.e. tested) statistics, provide a visualization of the UI Component tested, provide a visualization of tested and not-tested (also referred to respectively as "covered" and "not covered") UI Components of a UI Screen. Computer programs cause computer systems to perform many functions including generation of a UI. A UI includes UI Components, and the UI Components include UI Screens and UI Objects. A UI Screen is a virtual container in a computer program's UI. A UI Screen contains one or more UI Objects. The boundaries of a UI Screen can enclose one or more UI Objects. A UI Screen inherits all the properties a UI Object has in terms of UI test code coverage, so a UI Screen can be considered as a root container UI Object. As subsequently discussed in more detail, FIG. 7 depicts an exemplary UI Screen with UI Objects. A UI Object is a UI element in a computer program that when displayed is located inside the boundaries of a UI Screen. A UI Object can be a parent UI Object when the UI Object contains one or more other UI Objects within the display boundaries of the parent UI Object. In at least one embodiment, the relationship between a UI Component, a UI Object, and a UI Screen is that a UI Component is akin to a superclass, a UI Object inherits from a UI Component, and UI Screen inherits from UI Object. In at least one embodiment, the UI Object is akin to a 'root class' without a UI Component and the UI Screen inherits from the UI Object.

Determining test code coverage of UI Components can present a difficult task given a variety of obstacles. The obstacles include implementation of UI Components using multiple platforms with multiple technologies. Exemplary platforms include various hardware computing technologies and various internet applications such as various web browsers and web-based applications, and various database technologies. Another obstacle is the various computer program languages such as Java and C++ used to generate UI Components. An additional obstacle is the difficulty of integrating test code coverage suites with testing operations. An additional obstacle is gaps in technology platforms, particular open source platforms.

In at least one embodiment, to overcome the obstacles, the UI code coverage system and process are both programming language and platform independent. In at least one embodiment, the UI code coverage system and process generates UI test code coverage results based on the existence of a UI in a computer program without dependencies on the programming language used to develop the program containing the UI Components or the platform that hosts the program. Additionally, in at least one embodiment, the UI code coverage system and process is aware of which UI Components a program includes and which UI Components are tested by a test suite. By knowing which UI Components are present and covered by a test, the UI code coverage system and process can facilitate minimization of a number of tests used to test the UI Components. Additionally, in at least one embodiment, knowing exactly which UI Components are covered by a test suite and which are not, allows the expansion of the test suite with additional tests, in such a way that accurately targets the product UI that are not covered by a test suite. Additionally, overlapping of tests in the test suite can be kept to a minimum and as a result, the total number of tests required to fully cover a computer program can be kept to a minimum. Thus, in at least one embodiment, the UI code coverage system and process minimizes overlapping and/or unnecessary tests.

Furthermore, in at least one embodiment, executing a test suite is not a prerequisite for determining UI Component code coverage. In at least one embodiment, the UI code coverage system and process uses a static analysis of the computer program and test suites. Since the UI coverage metric depends on static analysis, in at least one embodiment, the UI code coverage system and process does not depend on the test results and, thus, executing the tests is not a prerequisite for processing and report generation by the UI code coverage system and process. In at least one embodiment, execution of the UI code coverage system and process provides test coverage metrics for the UI Components as soon as a test is developed and included in the test suite.

Figure 1:
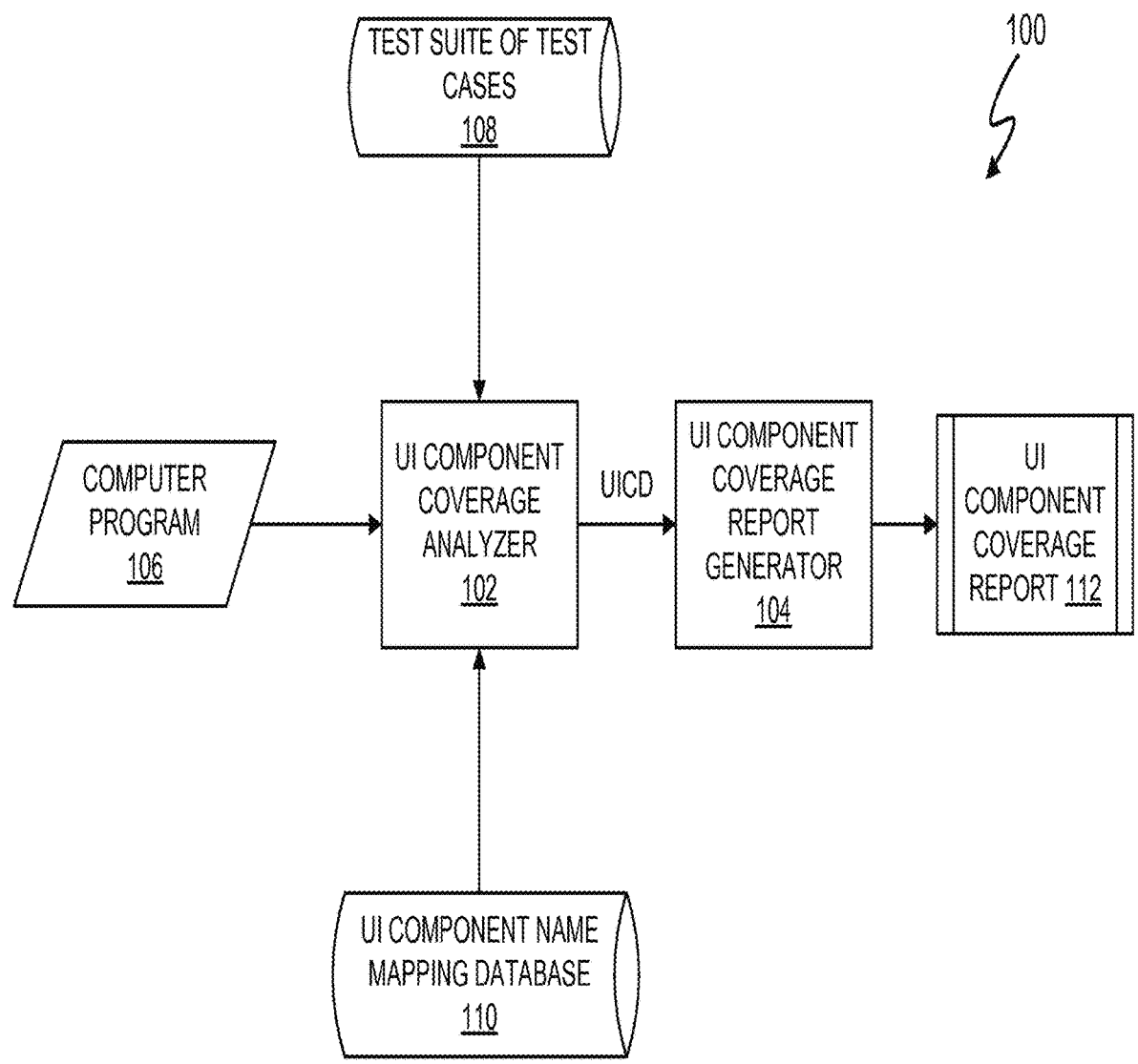
FIG. 1 depicts an exemplary UI code coverage system.
Figure 2:
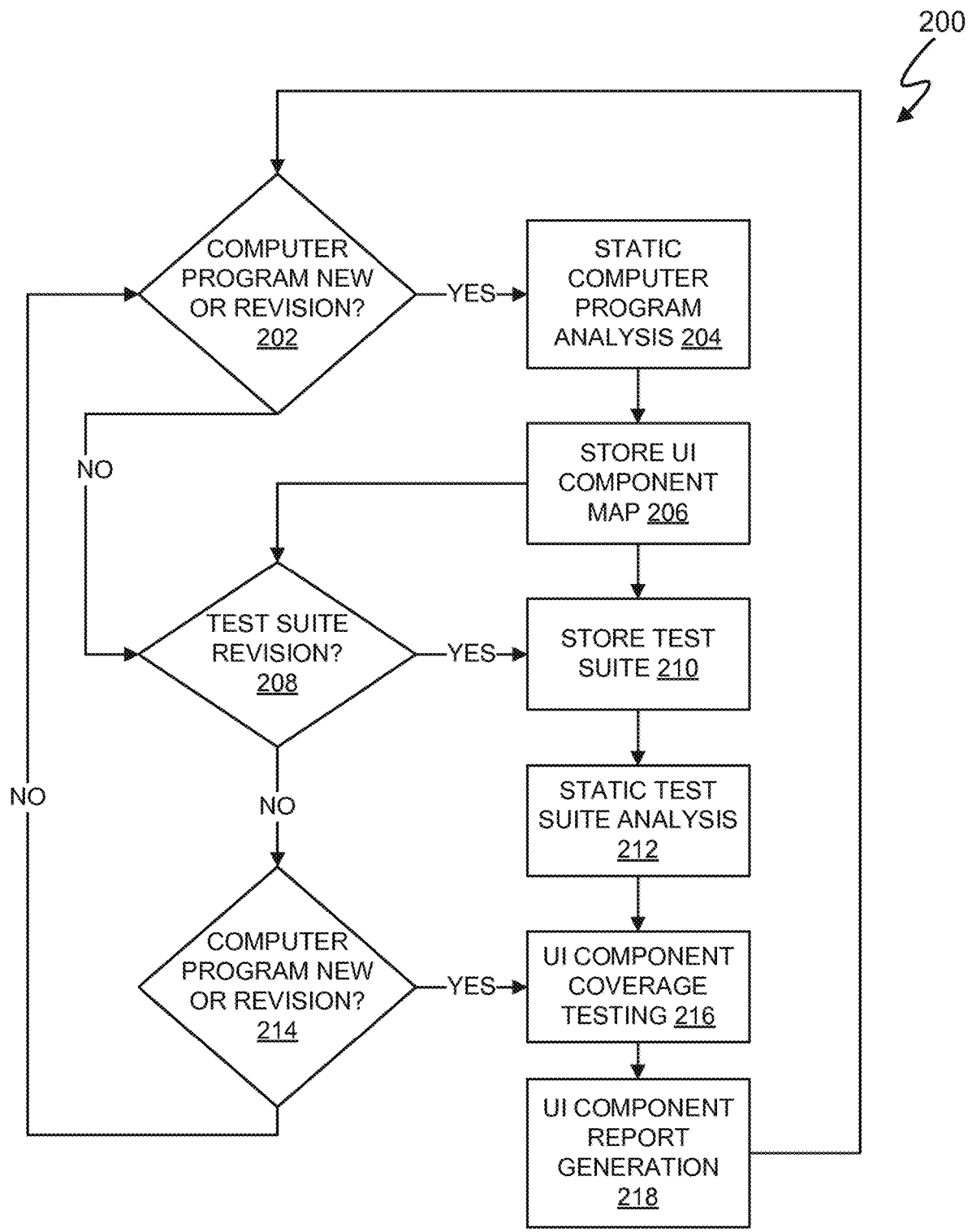
FIG. 2 depicts an exemplary UI code coverage process used in conjunction with the UI code coverage system of FIG. 1.

FIG. 1 depicts an exemplary UI code coverage system 100, and FIG. 2 depicts an exemplary UI code coverage process 200 used in conjunction with the UI code coverage system 100. Referring to FIGS. 1 and 2, the UI code coverage system 100 and UI code coverage process 200 determine a UI coverage measure that is used by the system and process to describe a degree to which a particular test suite tests the UI Components of a computer program. In at least one embodiment, the higher the UI coverage is for a product the more thoroughly the test suite tests the UI and the less likely a UI will contain software bugs. In at least one embodiment, a metric used to calculate the UI coverage is the percentage of UI Objects being accessed by the test suite compared with the total number of UI Objects present in the computer program.

In at least one embodiment, the UI Component coverage analyzer 102 utilizes both manual and automated processes to provide UI coverage data (UICD) to the UI Component coverage report generator 104. In operation 202, the UI code coverage process 200 determines if a new or revised computer program 106 is available for UI Component coverage analysis by the UI Component coverage analyzer 102. If yes, then the UI Component coverage analyzer 102 performs a static computer program analysis 204. The term "static" is used because, in at least one embodiment, the UI code coverage system 100 and UI code coverage process 200 do not require execution of the test cases in the test suite 108 to determine coverage of the UI Components in the computer program 106 by the test suite 108. In at least one embodiment, determining the coverage of the UI Components is derived from a determination of the coverage of the UI Objects within each UI Component.

The static computer program analysis operation 204 identifies the UI Screens and then, for each of the UI Screens, reduces the UI Screen into the UI Objects contained by the UI Screen. In at least one embodiment, the UI Objects are the smallest components of the UI in the computer program 106. The static computer program analysis operation 204 links every UI Component including the UI Objects within the UI Component with an image showing how the UI Object in a UI Component looks like when the UI of the computer program 106 is actually visually displayed. The static computer program analysis operation 204 also generates (i) an ID uniquely identifying each UI Component and (ii) coordinates that define a position of the UI Component on the displayed UI relatively to other UI Components. The static computer program analysis operation 204 stores the link, ID, and coordinate information of UI Objects of the UI Components in the UI Component name mapping database 110 in operation 206. For the UI Components that correspond to UI Screens, the static computer program analysis operation 204 stores additional information in the database 110, which in at least one embodiment, is a screen title and a description of the steps taken to open the UI Screen. In at least one embodiment, the static computer program analysis operation 204 is a manual effort that is performed once per computer program and, in at least one embodiment, before the test cases in the test suite 108 are created. In at least one embodiment, the static computer program analysis operation 204 is performed automatically by the UI Component coverage analyzer 102 upon receipt of the computer program 106 as an input.

In at least one embodiment, to perform the static analysis of the computer program 106 in operation 204, a name mapping file, also referred to as a GUI Map, is created by a team reviewing the computer program 106. GUI Maps are files which test execution engines use to locate UI Objects at runtime and automate them. In at least one embodiment, TestComplete is used to develop UI tests, and TestExecute runs the tests.

Figure 3:
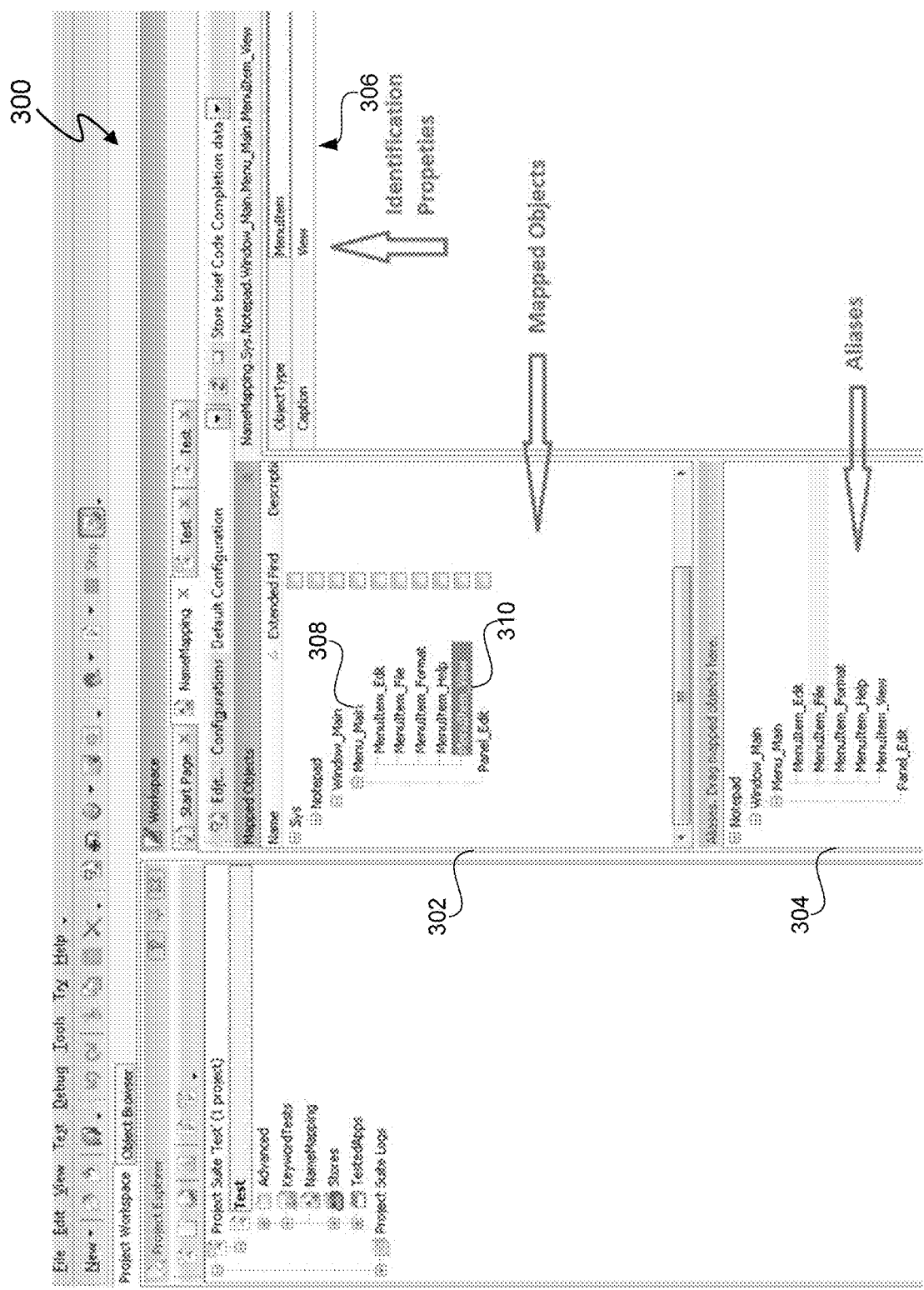
FIG. 3 depicts an exemplary GUI map.

FIG. 3 depicts an exemplary GUI map 300, in TestComplete's integrated development environment ("IDE"), which can be used by accessed by TestComplete to locate the UI Objects that are referenced by the test cases in test suite 108. The exemplary GUI map 300 is created for Windows Notepad computer program. There are three sections on the IDE of the GUI map 300: the mapped objects 302, aliases 304, and the identification (ID) properties 306. Aliases 304 point to mapped UI Objects. In at least one embodiment, each mapped object 302 has its own ID properties. In at least one embodiment, mapped objects 302 are also stored in a hierarchical model. A test execution engine locates a UI Object at runtime by following the mapped objects hierarchical path from a root UI Object down to the UI Object that is being searched for. On each level the test execution engine tries to locate the UI Object by using the ID properties as search criteria. In the above example, when the Menu_Main UI Object 308 has been identified at runtime and that the test execution engine searches for a MenuItem_View UI Object 310, a test execution engine iterates on all children objects of Menu_Main UI Object 308 until the UI Object that meets the ID criteria for MenuItem_View 310 is located. The UI Object MenuItem_View 310 will be returned as the one mapped by the MenuItem_View Object. In this particular case the identification criteria are:

A) ObjectType=MenuItem
B) Caption=View

In at least one embodiment, the names of the mapped objects, the aliases, and the ID properties of UI Objects are all manually specified by a name mapping planning team. The TestComplete IDE offers a default behavior to add a mapped object to the GUI map 300. However, the particular GUI map 300 tool is a matter of design choice.

However, conventional GUI maps do not contain any screen related information. Conventional GUI maps only contain mapped objects and their ID properties. In order to make it possible to extend the conventional GUI maps offered by TestComplete and attach to the Screens related information, the UI Component coverage analyzer 102 includes a TestComplete extension called referred to as the screen persistence tool 400.

Figure 4:
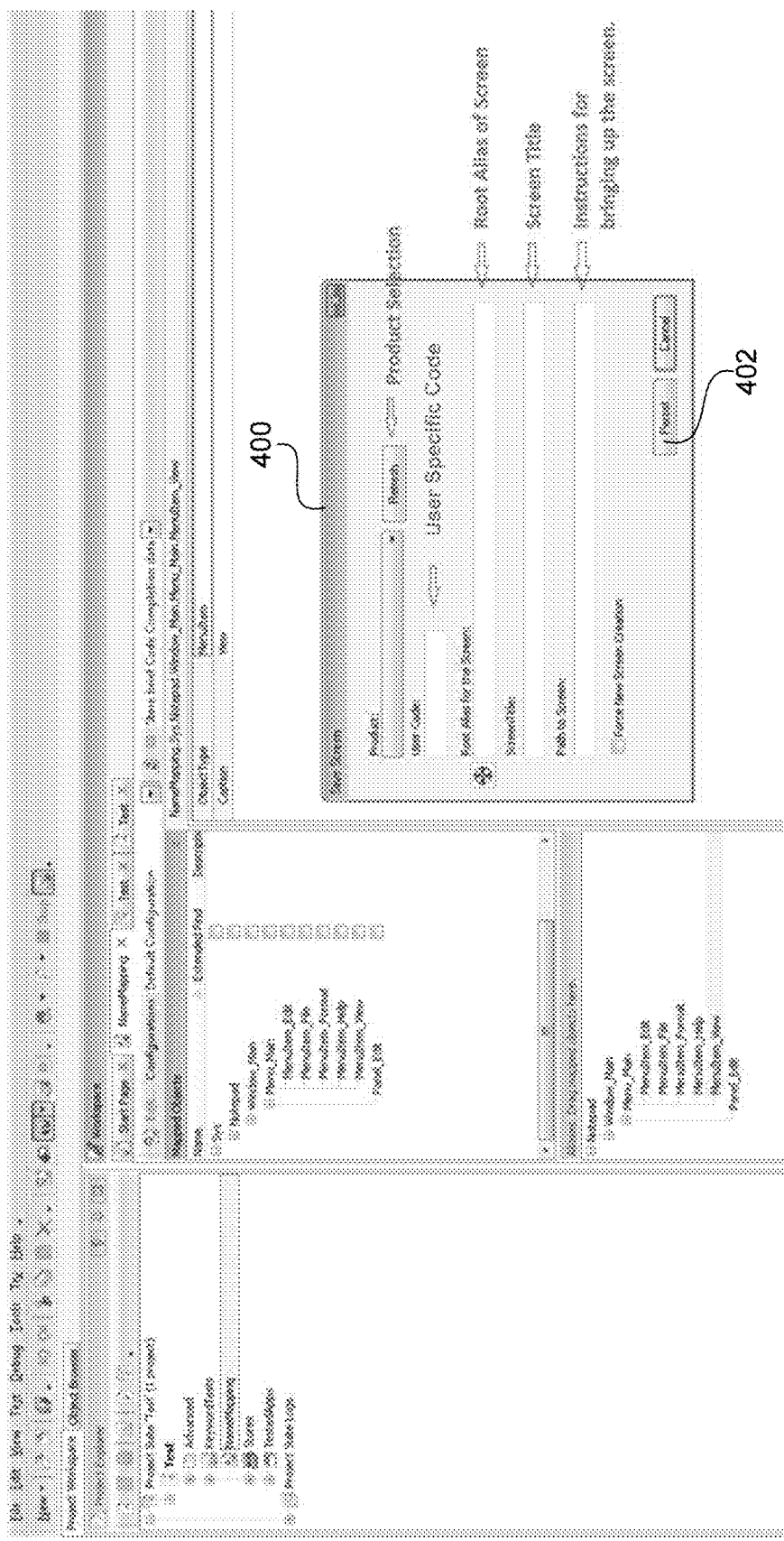
FIG. 4 depicts an exemplary screen persistence tool.

FIG. 400 depicts an exemplary screen persistence tool 400. The screen persistence tool 400 allows the name mapping planning team to save in the UI Component name mapping database 110 subsets of the NameMapping GUI map 300 and attach UI Screen components related information. In at least one embodiment, this process of saving and attaching is:
  a. A product screen is identified and all of its UI Objects are added to the GUI Map 300.
  b. Then, launch the screen persistence tool 400 as shown in FIG. 4.
  c. The name mapping planner specifies the following information:
    A) the computer program the UI Screen belongs to;
    B) a user code;
    C) the screen title;
    D) the alias that corresponds to the UI Screen's root UI Object container; and
    E) instructions to bring up the particular UI Screen for the computer program.

Once the information is specified and the persist button 402 is clicked, then the screen persistence tool 400 iterates over all the child aliases of the UI Screen root alias, captures each UI Object in a screenshot image that corresponds to each alias that points to the UI Object and belongs to the UI Screen, calculates their relative-to-the-screen coordinates, and saves all of the information along with the UI Object image into the UI Component name mapping database 110, through, for example, a web service layer (not shown). A confirmation message is returned back to the user with a status for each of the UI Objects that have been saved. The size of the UI Object image is a matter of design choice and is, for example, the same size as the captured UI Object.

The same process is repeated for all of the product's screens allowing the name mapping planning team to create an extended GUI Map 300 with UI Screen related information. Thus, in at least one embodiment, the UI Component coverage analyzer 102 bases UI Component coverage on UI Screens on the database 110 including all the UI Screens, the aliases that point to its UI Objects, screenshots of all UI Objects, and the screen related coordinates.

In at least one embodiment, the UI Component coverage analyzer 102 determines test coverage without regard to the platform used to display the UI Screen or the programming language used to generate the UI Objects of a UI Screen. In at least one embodiment, the UI Component coverage analyzer 102 extracts UI Object properties from different UI technologies and allows the name mapping planning team to store UI map information in a technology invariant model, i.e. UI Component name mapping database 110. The UI Component coverage analyzer 102 encapsulates technology to extract UI Objects and the properties of the UI Objects. The name mapping database 110 is a technology invariant model to store the UI Object identification properties in a hierarchical way.

Referring to FIGS. 1 and 2, after storing the UI Component map (e.g. GUI map 400) in the database 110 or if the outcome of operation 202 is "no", operation 208 determines whether any test cases in test suite 108 have been modified. If the test cases have been modified, in operation 210 the UI Component coverage analyzer 102 stores the test suite and then performs a static test suite analysis in operation 212. Operation 212 extracts from the test cases, the ID's of the UI Objects of the UI Components that are being accessed by the test suite. Thus, the test cases are developed using standards that enforce the usage of the UI Object and UI Component ID's in the test cases. Operation 212 collects and saves the ID's in the UI Component name mapping database 110 along with data correlating the ID's to the test cases associated with the collected ID's. In at least one embodiment, operation 212 is an automated process.

After operation 212 or after operation 214 if there is no test suite revision but the computer program is new or revised, operation 216 performs UI Component coverage testing in operation 216. Operation 216 determines the UI code coverage by the test cases in test suite 108 relative to the number UI Components in the computer program 106. In at least one embodiment, the code coverage is expressed as a percentage which equals the number of covered UI Components divided by the total UI Components times one hundred percent.

Because of the static UI code coverage testing obtained by the UI Component coverage analyzer 102, the UI Component report generation 218 causes the UI Component coverage report generator 104 to receive the UI coverage data (UICD) from the UI Component coverage analyzer 102 and to generate comprehensible and apprehensible UI Component coverage 112 that includes the reports of FIGS. 5-8.

FIG. 5 depicts an exemplary, UI Component code coverage summarized report 500 for the products identified as COMPUTER PROGRAMS A, B, and C. On the product level the UI Component code coverage report 500 includes the Total Number of UI Components, the Number of UI Components being accessed by the test suite 108 and the coverage metric which is: [Number of Covered UI Components]/[Total Number of UI Components]. Thus, for COMPUTER PROGRAM A, the test suite 108 has 12 tests, 129 covered UI Objects, a total of 797 UI Objects and a covered percentage measure of 16.19% (129/797·100%) and so on for COMPUTER PROGRAMS B and C.

Figure 6:
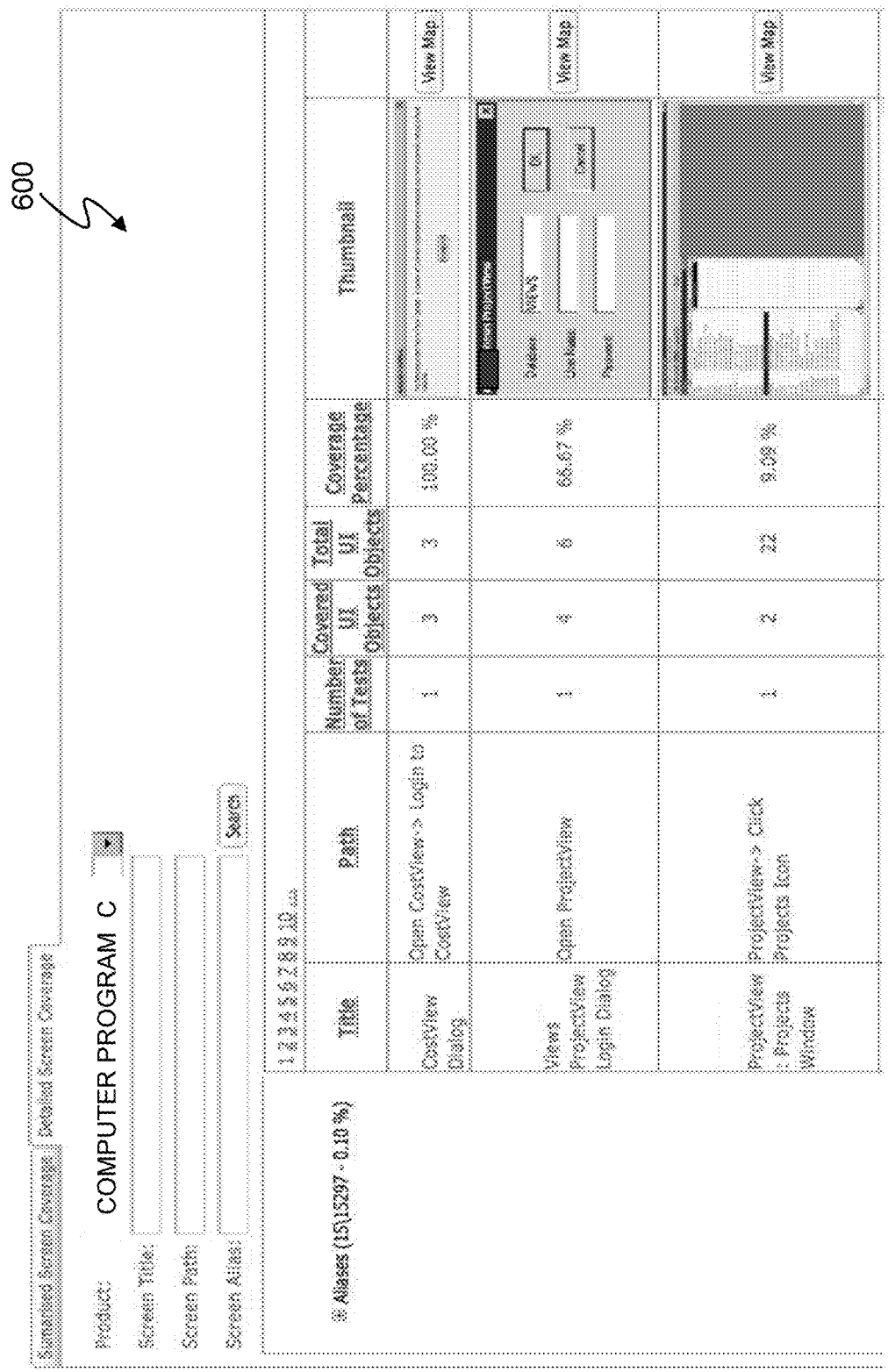

FIG. 6 depicts an exemplary detailed UI Component code coverage report 600 for COMPUTER PROGRAM C. In this embodiment, UI components include one or more UI objects. Therefore, coverage of UI objects directly correlates with the UI component code coverage. Drilling in to the UI Screen level in UI Component code coverage report 600, the UI Screens are reported along with each UI Screen display, the total number of tests that access at least one UI Component of the Screen, the total number of UI Components on the screen, the number of UI Components being accessed on the screen and a UI Screen coverage metric which is: [Number of Covered UI Components on the screen]/[Total Number of UI Components on Screen]·100%. The UI Component code coverage report 600 additionally displays a thumbnail image next to each screen, a screen title, and the path to follow to open the particular screen on the product.

FIG. 7 depicts a UI Screen component level report 700. The UI Screen component level report 700 includes an image map of the screen and solid and dashed rectangles surrounding each of the six UI Objects on the screen. The rectangles are rendered around each UI Object using the coordinates information that was collected during the static computer program analysis 204. The solid rectangle 703 around the UI Object "Cancel" represents a non-covered UI Component. The uniformly dashed rectangles 704, 706, and 708 represent covered UI Objects "Database," "User Name," "Password," and "OK." The long and short non-uniform dashed rectangles 710 represent partially covered components. Partially covered UI Components are UI Components that are not directly accessed by the test suite 108 but contain one or more child UI Components that are covered and one or more child UI Components that are not covered. In the embodiment of UI Screen component level report 700, the UI Screen "Views ProjectView" includes a UI Component UI Screen 702 that contains covered UI Objects "Database," "User Name," "Password," and "OK" and the non-covered UI Object "Cancel." In at least one embodiment, the UI Component coverage report generator 104 generates the UI Component coverage report 112 so that a UI Component, such as the UI Screen 702, that contain child components are reported as "covered" when all of the UI Component's children are covered or when the UI Component is directly accessed by the test suite 108. The manner of indicating coverage is a matter of design choice. For example, dashed and solid lines can be used and/or colors can be used, such as "green" for covered, "red" for non-covered, and "orange" for partially covered.

Figure 8:
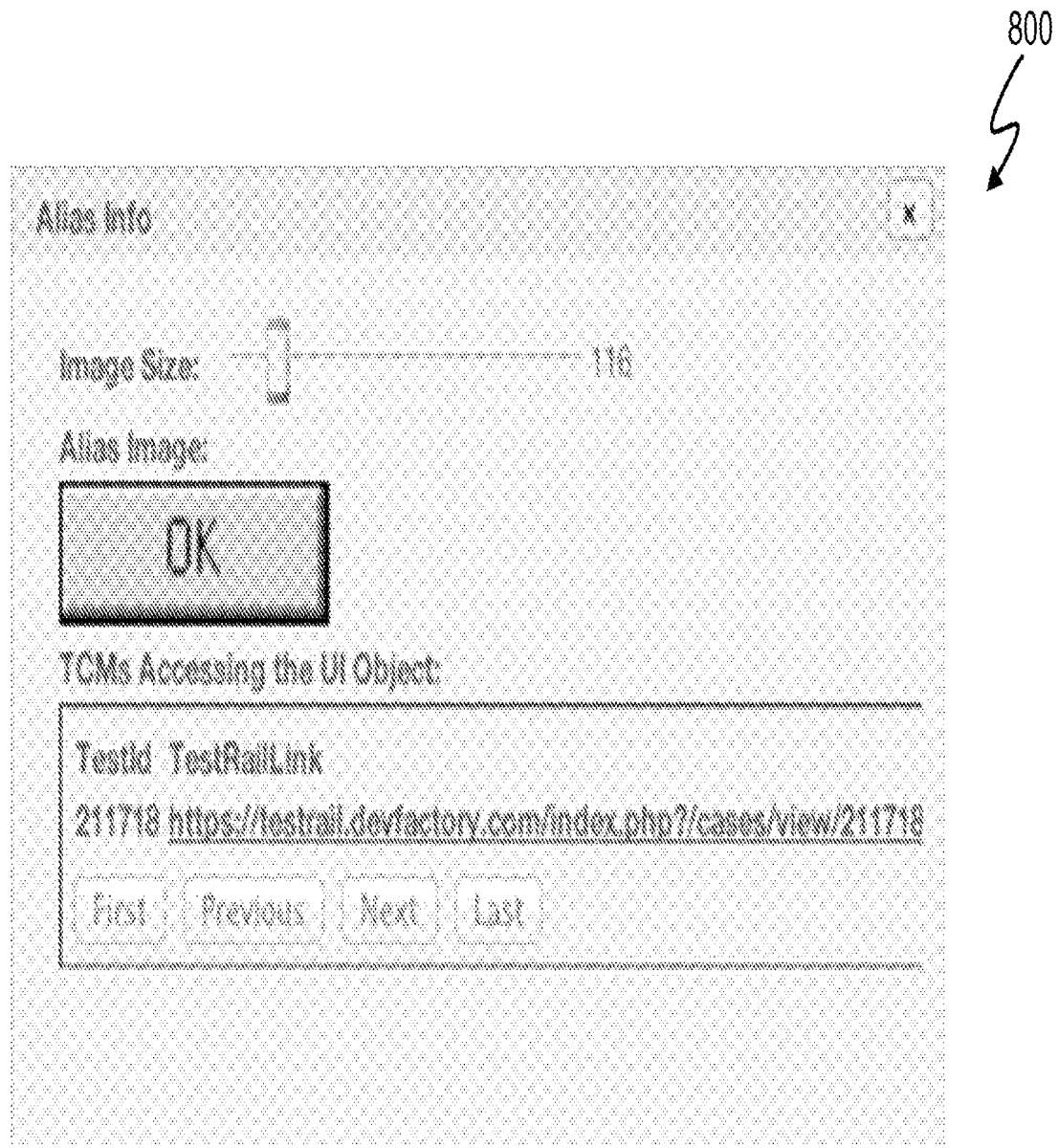

FIG. 8 depicts an individual UI Component code coverage report 800 and provides an image size, the alias image, and the particular test case that accessed the UI Component.

Thus, the UI code coverage system and process provide a user interface ("UI") code coverage system and process determines the coverage by test code of UI Components in a computer program. In other words, the UI code coverage system and process determine whether the test code tests a UI Component. In at least one embodiment, the UI code coverage system and process identify the particular UI Components tested by the test code, provide coverage (i.e. tested) statistics, provide a visualization of the UI Component tested, provide a visualization of covered and not covered UI Components of a UI Screen.

Figure 9:
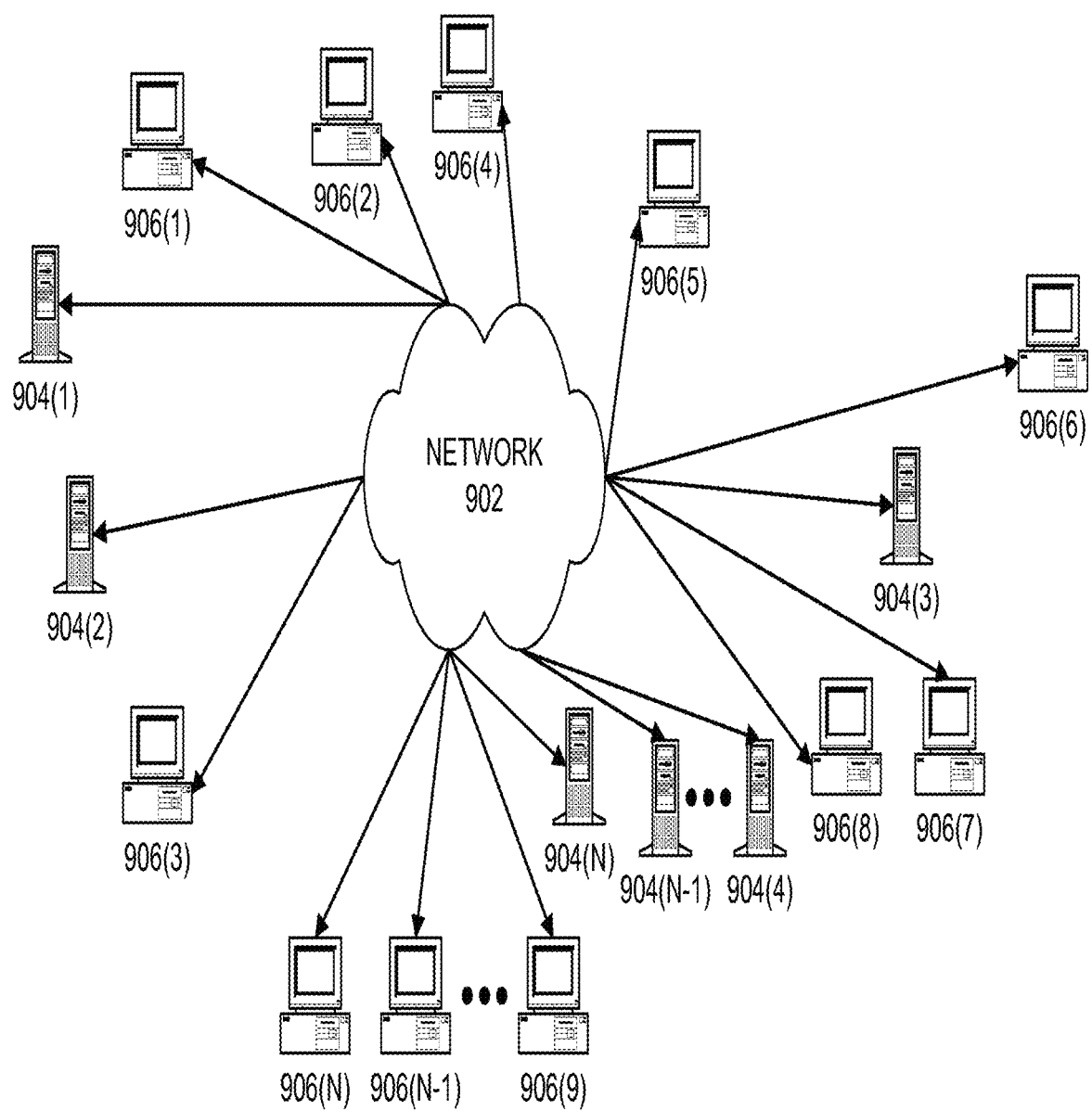
FIG. 9 depicts an exemplary network environment in which the system of FIG. 1 and the process of FIG. 2 may be practiced.

FIG. 9 is a block diagram illustrating a network environment in which a UI code coverage system 100 and method 200 may be practiced. Network 902 (e.g. a private wide area network (WAN) or the Internet) includes a number of networked server computer systems 904(1)-(N) that are accessible by client computer systems 906(1)-(N), where N is the number of server computer systems connected to the network. Communication between client computer systems 906(1)-(N) and server computer systems 904(1)-(N) typically occurs over a network, such as a public switched telephone network over asynchronous digital subscriber line (ADSL) telephone lines or high-bandwidth trunks, for example communications channels providing T1 or OC3 service. Client computer systems 906(1)-(N) typically access server computer systems 904(1)-(N) through a service provider, such as an internet service provider ("ISP") by executing application specific software, commonly referred to as a browser, on one of client computer systems 906(1)-(N).

Client computer systems 906(1)-(N) and/or server computer systems 904(1)-(N) may be, for example, computer systems of any appropriate design, including a mainframe, a mini-computer, a personal computer system including notebook computers, a wireless, mobile computing device (including personal digital assistants, smart phones, and tablet computers). These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. In at least one embodiment, the UI code coverage system 100 and method 200 can be implemented using code stored in a tangible, non-transient computer readable medium and executed by one or more processors. In at least one embodiment, the UI code coverage system 100 and method 200 can be implemented completely in hardware using, for example, logic circuits and other circuits including field programmable gate arrays.

Figure 10:
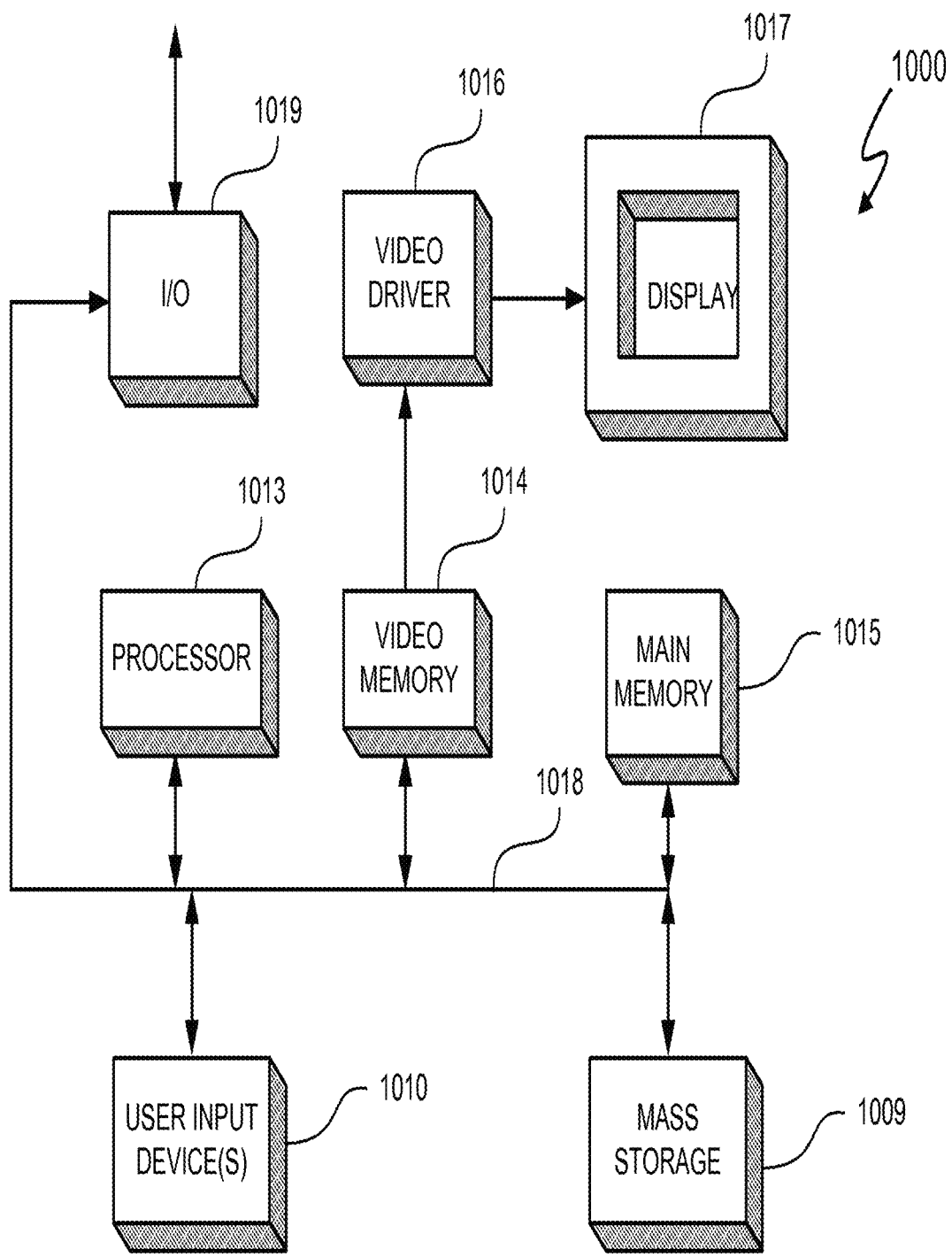
FIG. 10 depicts an exemplary computer system.

Embodiments of the UI code coverage system 100 and method 200 can be implemented on a specially programmed computer system such as the computer 1000 illustrated in FIG. 10. Input user device(s) 1010, such as a keyboard and/or mouse, are coupled to a bi-directional system bus 1018. The input user device(s) 1010 are for introducing user input to the computer system and communicating that user input to processor 1013. The computer system of FIG. 10 generally also includes a non-transitory video memory 1014, non-transitory main memory 1015, and non-transitory mass storage 1009, all coupled to bi-directional system bus 1018 along with input user device(s) 1010 and processor 1013. The mass storage 1009 may include both fixed and removable media, such as a hard drive, one or more CDs or DVDs, solid state memory including flash memory, and other available mass storage technology. Bus 1018 may contain, for example, 32 of 64 address lines for addressing video memory 1014 or main memory 1015. The system bus 1018 also includes, for example, an n-bit data bus for transferring DATA between and among the components, such as CPU 1009, main memory 1015, video memory 1014 and mass storage 1009, where "n" is, for example, 32 or 64. Alternatively, multiplex data/address lines may be used instead of separate data and address lines.

I/O device(s) 1019 may provide connections to peripheral devices, such as a printer, and may also provide a direct connection to a remote server computer systems via a telephone link or to the Internet via an ISP. I/O device(s) 1019 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 1009, into main memory 1015 for execution. The method and functions relating to UI code coverage system 100 and method 200 may be implemented in a computer program that, when executed by processor 1013 of the computer 1000, configures and, thus, transforms the computer 1000 into a new and specialized machine. Web pages are, in at least one embodiment, created using hypertext markup language or other language compatible with one or more types of web browsers. In at least one embodiment, Java applets or any other technology is used with web pages to allow a user of a web browser to make and submit selections and allow a client computer system to capture the user selection and submit the selection data to a server computer system.

The processor 1013, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the display 1017. Video amplifier 1016 is well known in the art and may be implemented by any suitable means. This circuitry converts pixel DATA stored in video memory 1014 to a raster signal suitable for use by display 1017. Display 1017 is a type of monitor suitable for displaying graphic images.

The computer system described above is for purposes of example only. The UI code coverage system 100 and method 200 may transform any type of computer system or programming or processing environment into a special purpose machine. It is contemplated that the UI code coverage system 100 and method 200 might be run on a stand-alone computer system, such as the one described above. The UI code coverage system 100 and method 200 might also be run from a server computer systems system that can be accessed by a plurality of client computer systems interconnected over an intranet network. Finally, the UI code coverage system 100 and method 200 may be run from a server computer system that is accessible to clients over the Internet.

Although embodiments have been described in detail, it should be understood that various changes, substitutions, and alterations can be made hereto without departing from the spirit and scope of the invention as defined by the appended claims.

What is claimed is:

1. A method comprising:
   sending a computer program that includes UI components to a computer system;
   receiving a report of the coverage by test code of the UI components, wherein the computer system is programmed with code stored in a memory and execution by a processor of the computer system to determine the coverage by the test code of user interface (UI) components in a computer program comprises:
   (a) locating a UI object in one of the UI components by following a mapped objects hierarchical path in a UI map from a root UI object down to the UI object being located;
   (b) linking the UI object located with an image showing how the UI object in the UI component looks when the UI of the computer program is actually visually displayed;
   (c) storing the link, an identifier (ID) of the UI object located, and screen location coordinate information of the UI object located in a UI component name mapping database;
   (d) repeating (a)-(c) for additional UI objects in the UI map;
   (e) extracting from the test code, ID's of the UI objects in the UI components that are being accessed by the test code;
   (f) determining the coverage by the test code of the UI components by comparing a number of the UI objects located in the UI components in the computer program relative to a number of the UI objects extracted from the test code to determine coverage of the UI objects in the UI components by the test code, wherein determining coverage of the UI components is derived from a determination of the coverage of the UI objects in the UI components; and
   (g) generating the report of the coverage by the test code of the UI components.

2. The method of claim 1 wherein execution of the second code further comprises:
   performing by the computer system programmed with the code stored in a memory and executing by the processor of the computer system:
   determining if the computer program has changed;
   determining if the test code has changed; and
   when either the computer program or the test code has changed, performing elements (a)-(g).

3. The method of claim 1 wherein the performance of elements (a)-(g) is platform independent.

4. The method of claim 1 wherein determining the coverage by the test code of the UI components by comparing a number of UI components in the computer program relative to a number of UI components extracted from the test code comprises:
   determining of the UI objects being accessed by the test code compared with a total number of UI Objects present in the computer program.

5. The method of claim 1 wherein elements (a)-(g) are performed without executing the computer program and without executing the test code.

6. The method of claim 1 wherein execution of the code further comprises:
   determining the coverage by the test code without regard to a platform used to display a UI screen that includes the UI Components.

7. A system comprising:
   a processor; and
   a memory, coupled to the processor, having first code stored therein and executable by the processor to:
   send a computer program that includes UI components to a computer system;
   receive a report of the coverage by test code of the UI components,
   wherein the computer system is programmed with second code stored in a memory and execution by a processor of the computer system to determine the coverage by the test code of user interface (UI) components in a computer program comprises:
   (a) locating a UI object in one of the UI components by following a mapped objects hierarchical path in a UI map from a root UI object down to the UI object being located;
   (b) linking the UI object located with an image showing how the UI object in the UI component looks when the UI of the computer program is actually visually displayed;
   (c) storing the link, an identifier (ID) of the UI object located, and screen location coordinate information of the UI object located in a UI component name mapping database;
   (d) repeating (a)-(c) for additional UI objects in the UI map;

(e) extracting from the test code, ID's of the UI objects in the UI components that are being accessed by the test code;

(f) determining the coverage by the test code of the UI components by comparing a number of the UI objects located in the UI components in the computer program relative to a number of the UI objects extracted from the test code to determine coverage of the UI objects in the UI components by the test code, wherein determining coverage of the UI components is derived from a determination of the coverage of the UI objects in the UI components; and (g) generating the report of the coverage by the test code of the UI components.

8. The system of claim 7 wherein the second code is further executable to:

determine if the computer program has changed;

determine if the test code has changed; and when either the computer program or the test code has changed, perform elements elements (a)-(g).

9. The system of claim 7 wherein the performance of elements (a)-(g) is platform independent.

10. The system of claim 7 wherein to determine the coverage by the test code of the UI components by comparing a number of UI components in the computer program relative to a number of UI components extracted from the test code comprises:

to determine of the UI objects being accessed by the test code compared with a total number of UI Objects present in the computer program.

11. The system of claim 7 wherein the elements (a)-(g) are performed without executing the computer program and without executing the test code.

* * * * *